United States Patent
Moon et al.

(10) Patent No.: US 7,426,725 B2
(45) Date of Patent: Sep. 16, 2008

(54) CROSS-MODULE IN-LINING

(75) Inventors: Sungdo Moon, Cupertino, CA (US); XinLiang David Li, Sunnyvale, CA (US); Dhruva R. Chakrabarti, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 623 days.

(21) Appl. No.: 10/783,761

(22) Filed: Feb. 20, 2004

(65) Prior Publication Data

US 2005/0188363 A1   Aug. 25, 2005

(51) Int. Cl.
G06F 9/44 (2006.01)
G06F 9/45 (2006.01)

(52) U.S. Cl. .................. 717/157; 717/120; 717/140; 717/151

(58) Field of Classification Search .......... 717/151–161
See application file for complete search history.

(56) References Cited

U.S. PATENT DOCUMENTS 5,701,489 A * 12/1997 Bates et al. ............... 717/157
5,940,620 A * 8/1999 Graham ..................... 717/158
2003/0005421 A1 * 1/2003 Prakash et al. ............. 717/152

OTHER PUBLICATIONS

Ayers et al, Aggressive Inlining, 1997, ACM, p. 134-145.*
Moon et al., "SYZYGY—A Framework for Scalable Cross-Module IPO", 2004 IEEE, pp. 1-10.*
Chakrabarti et al., "Scalable High Performance Cross-Module Inlining", 2004 IEEE, pp. 1-12.*

* cited by examiner

Primary Examiner—Eric B. Kiss
Assistant Examiner—Ben C Wang

(57) ABSTRACT

Techniques for cross-module in-lining are disclosed. In an embodiment, in-lining is done in conjunction with a 3-phase compiler including a front-end phase, an IPA (Inter-Procedural Analysis) phase, and a back-end phase. The front-end phase processes the source code in various modules and provides the intermediate representations of such source code. The IPA phase determines whether a function should be in-lined, and, if so, provides in-line transformation instructions for the back-end phase to execute. The back-end phase executes the instructions provided by the IPA, which, in effect, transforms the in-lining code.

19 Claims, 8 Drawing Sheets f1.c

305 foo (){

310  bar()

} f2.c

315 bar (){

320  func()

} f3.c

325 func (){

305 foo (){

310  bar()

} f2(1).o

315 bar (){

320  func()

} f3(1).o

325 func (){

305 foo (){

310  bar()

}

330 bar(){

} f2(2).o

315 bar (){

320  func()

} f3(2).o

325 func (){

305 foo (){

310  function bar() in-lined herein

}

330 bar(){
being deleted after in-lined into function foo()

} f2(3).o

315 bar (){ being deleted

} f3(3).o

325 func (){

}

FIG. 3D ff1.c
505 ffoo (){

510   bbar()

} ff2.c
515 bbar (){

520   ffunc()

} ff3.c
525 ffunc (){

}

FIG. 5A ff1(1).o
505 ffoo (){

510   bbar()

} ff2(1).o
515 bbar (){

520   ffunc()

} ff3(1).o
525 ffunc (){

}

FIG. 5B ff1(2).o
505 ffoo (){

510   bbar()

}

530 bbar(){

}

540 ffunc(){

} ff2(2).o
515 bbar (){

520   ffunc()

} ff3(2).o
525 ffunc (){

}

FIG. 5C ff1(3).o
505 ffoo (){

510  function bbar() and ffunc() being in-lined herein

}

530 bbar(){
being deleted after in-lining
}

540 ffunc(){
being deleted after in-lining
} ff2(3).o
515 bbar (){ being deleted

} ff3(3).o
525 ffunc (){ being deleted

```
bar(int p) { if (p==0) {

710
    . . .
    720

} else {

```
bar_clone_1(int p) { if (p==0) {

```
bar_clone_2(int p) { if (p!=0) {

CROSS-MODULE IN-LINING

FIELD OF THE INVENTION

The present invention relates generally to software having multiple modules and, more specifically, to cross-module in-lining.

BACKGROUND OF THE INVENTION

In approaches for low-level program optimization, a compiler compiles and optimizes each module independently, and a linker links the compiled modules to form a program executable. Consequently, program optimization in these approaches is limited to individual modules because the compiler while compiling a particular module does not have access to information of other modules. In high-level or inter-procedural optimization approaches, the compiler compiles various modules at the same time, and, while compiling, has access to information of those various modules. As a result, the compiler, using such information, can better optimize the modules and thus the program. However, concurrently compiling/optimizing many modules encounters various problems such as exceeding memory limitations, requiring large amount of resources to maintain the large amount of information, data structure, etc.

In-lining refers to the process of copying programming code or body of a function to be called (the callee) into the function body of the calling function (the caller). In-lining provides good opportunities for optimization. Cross module in-lining refers to in-lining when the caller and the callee are in different modules. A compiler for cross-module optimization generally includes three phases, e.g., the front-end phase, the IPO (Inter-Procedural Optimization) phase, and the back-end phase. In an approach for cross-module optimization based on in-lining, the 3-phase compiler in-lines the code during the IPO phase, causing a bottle neck and longer time at this phase because while the front-end phase and the back-end phase can perform their tasks in parallel the IPO phase performs its tasks in series. Further, this approach may require multiple reading and writing the IR (Intermediate Representation) during the IPO phase, which results in a significant overhead for this phase.

SUMMARY OF THE INVENTION

The present invention provides techniques for cross-module in-lining, which, in an embodiment, is done in conjunction with a 3-phase compiler including a front-end phase, an IPA (Inter-Procedural Analysis) phase, and a back-end phase. The front-end phase processes the source code in various modules and provides the intermediate representations of such source code. The IPA phase performs cross-module in-lining analysis on those intermediate representations, determines whether one or a plurality of functions should be in-lined, and, if so, provides in-line transformation instructions for the back-end phase to execute. Output of the IPA phase is in the form of optimized intermediate representations. The back-end phase executes the instructions on the optimized intermediate representations provided by the IPA, which, in effect, transforms the in-lining code, and performs further optimization on those optimized intermediate representations. A linker links all modules containing the optimized intermediate representations provided by the back-end phase to form a program executable. In one aspect, transforming in-lining code in the back-end phase saves compile time.

BRIEF DESCRIPTION OF THE DRAWINGS

The present invention is illustrated by way of example, and not by way of limitation, in the figures of the accompanying drawings in which like reference numerals refer to similar elements and in which:

FIGS. 3A-3D show a first three modules and their corresponding intermediate representation and optimized intermediate representation modules for illustrating cross-module in-lining for those three modules;

FIGS. 5A-5D shows a second three modules and their corresponding intermediate representation and optimized intermediate representation modules for illustrating cross-module in-lining for those three modules;

FIGS. 7A-C shows a function and its two clones to illustrate how cloning is performed.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention. Further, unless otherwise specified, terms used in this document have ordinary meaning to those skilled in the art.

Overview

Figure 1:
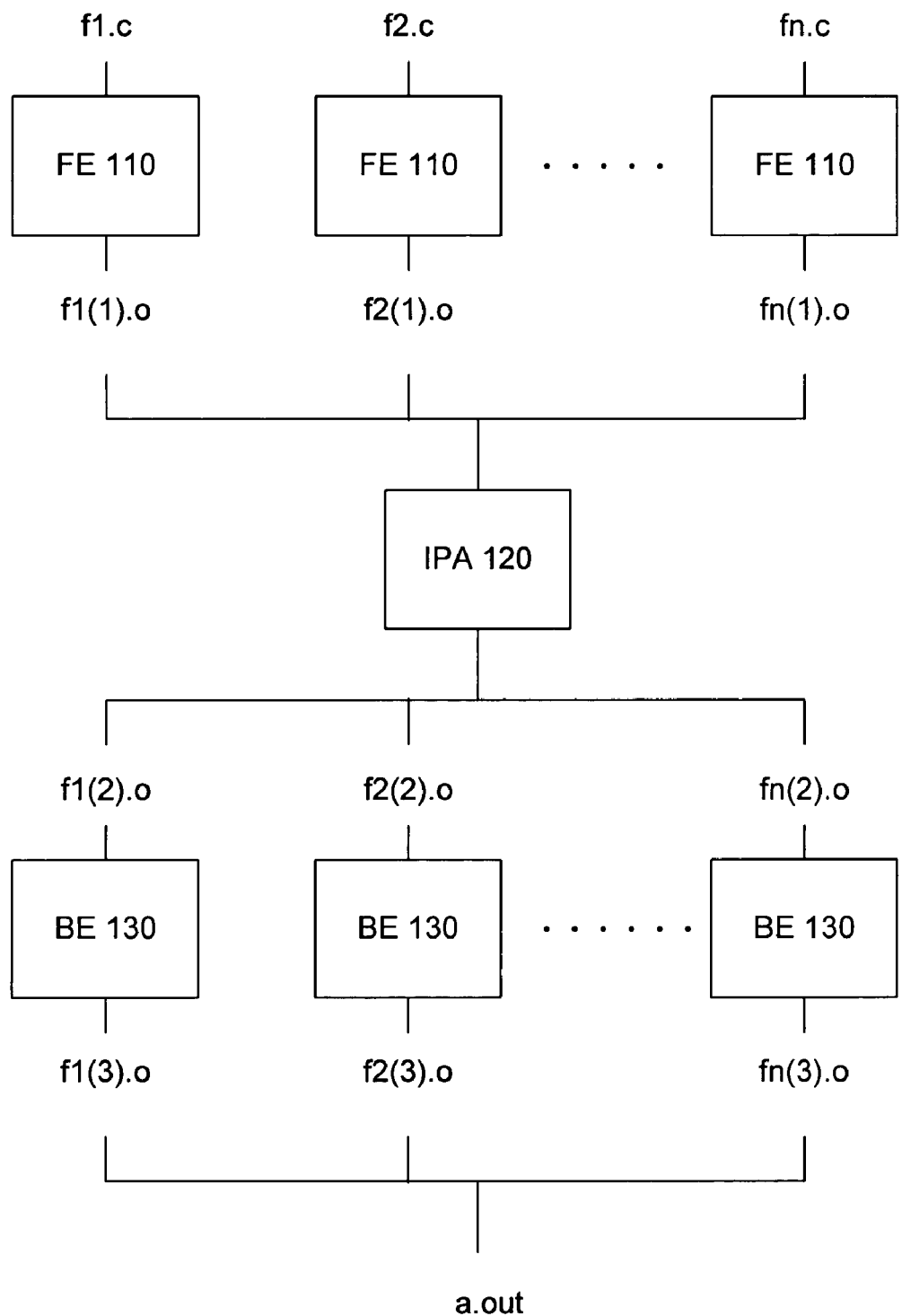
FIG. 1 shows a diagram illustrating a cross-module compiler in accordance with an embodiment.

FIG. 1 shows a diagram illustrating a cross-module compiler 100 in accordance with an embodiment that includes a front-end (FE) phase 110, an IPA (Inter-Procedural Analysis) phase 120, and a back-end (BE) phase 130. Generally, the three phases FE 110, IPA 120, and BE 130 are transparent to the user. That is, the user does not know that there are three phases in the compiling process. In an alternate embodiment, each phase 110, 120, and 130 is independent of one another, i.e., each is not part of compiler 100, and is provided as a separate program or executable. Generally, compiler 100, upon completing the front-end phase, invokes the IPA phase, then the back-end phase. Compiler 100 may also be referred to as an optimizer because it optimizes the modules provided to it as inputs. Similarly, IPA 120 may be referred to as CMA (Cross-Module Analysis). However, embodiments of the invention are not limited to how a phase is named or whether it is part of a compiler.

The Front-End Phase

FE 110 receives as inputs a plurality of program files or modules, e.g., f1.c to fn.c that include program source code, processes these modules, and provides a plurality of modules f1(1).o to fn(1).o, each of which corresponds to a source module f1.c to fn.c and includes the intermediate representations (IRs) of the source code. In various embodiments, a linker links modules f1(1).o to fn(1).o and performs symbol resolutions. Exemplary tasks of FE 110 include scanning, parsing, analyzing, simplifying, canonicalizing the source code, providing data summary, etc. In an embodiment, the FE phase 110, after finishing its tasks, invokes the IPA phase 120.

The IPA Phase

IPA 120 performs cross-module analysis on modules f1(1).o to fn(1).o and provides a plurality of modules, e.g., f1(2).o to fn(2).o, each of which corresponds to a module f1(1).o to fn(1).o and includes the intermediate representations optimized from the intermediate representations in modules f1(1). o to fn(1).o. These optimized intermediate representations may be referred to as OIRs. Further, IPA 120 performs in-line analysis to determine whether one or more functions should be in-lined. Examples of criteria for in-lining include: opportunities for improving program performance, small-sized callees, callees with a single caller, callees being called numerous times by a caller, callees being called in a loop, call-site parameters having certain attributes such as constant values, lower height in a call graph, register pressure (i.e., amount of utilization of available registers), etc. IPA 120's analysis may result in keeping or deleting the function body of the callee as appropriate. For example, if a function foo1( ) in module f1(2).o is the only function that invokes another function, e.g., function bar( ), then IPA 120 may provide appropriate instructions for BE 130 to delete the body of function bar( ) after in-lining the body of function bar( ) into function foo1( ). This is because there is no other use for the body of function bar( ) after in-lining. However, if another function, e.g., function foo2( ), also invokes function bar( ), then after being in-lined into function foo1( ), the body of function bar( ) is kept to be used by function foo2( ). Alternatively, for further illustration purposes, the body of function bar( ) after being in-lined into function foo2( ) may be deleted or kept for use by another function, e.g., function foo3( ), etc. Depending on implementations, IPA 120 may create a call graph and use such call graph to make in-lining decisions. A call graph shows the relationship between callers and callees.

In an embodiment, IPA 120, after the in-lining decisions, copies the body of the callee(s) into the module(s) containing the caller(s) from which in-lining may be performed. Such copying is done so that the code of the callee can later be in-lined into the caller. Alternatively, IPA 120 provides the location of the callee body from which the callee may be located. Generally, providing the location of the callee is appropriate when the callee would be copied numerous times into numerous modules that would take up resources. In accordance with techniques in embodiments of the invention, the body of the callees may be stored in a file, a library, etc., that is shared by the modules.

IPA 120 also provides information so that BE 130 can perform in-lining transformation. Such information includes, for example, the list of callers and the list of corresponding callees, the locations of the callees or their clones, the order to be in-lined, decisions whether to keep the body of the callee after transformation, etc. The information may be in the form of specific instructions for BE 130 to follow or in general terms so that BE 130 can rely on its intelligence to act on the information as appropriate. For example, the instructions may be specific such that BE 130 follows an exact order such as in-lining a first function, e.g., function func( ), into a second function, e.g., function bar( ), then in-lining function bar( ) into a third function, e.g., function foo( ). Alternatively, the instructions can be general so that BE 130 independently determines the order of in-lining function bar( ) and function func( ) that are eventually in-lined into function foo( ). Further, BE 130 may determine to clone the callee and use this clone instead of the original body of the callee. Cloning refers to creating various versions of the same function to optimize the function's performance. Generally, each cloned version performs better if a condition is satisfied. If the condition corresponding to a cloned function is met, then that cloned function, instead of the original function, is used, and the program therefore executes better because it runs a better version of the function.

Other exemplary tasks of IPA 120 includes performing name or symbol resolutions, creating global symbol tables, constructing the call graphs, determining semantic legality, etc. In an embodiment, IPA 120, after performing its tasks, invokes the back-end phase 130 for each module f1(2).o to fn(2).o.

Because IPA 120 has access to various IR modules f1(1).o to fn(1).o, IPA has information from those modules while performing its tasks and thus provides a better analysis than approaches that do not have information from different modules.

The Back-End Phase

BE 130 performs further optimization on modules f1(2).o to fn(2).o and provides a plurality of OIR modules, e.g., modules f1(3).o to fn(3).o from which a linker links them to form a program executable, e.g., a.out, in a C-programming embodiment. FIG. 1 shows a plurality of FE 110 and BE 130 to indicate that tasks in each of the front-end and back-end phase can be performed separately and/or in parallel.

From the information provided by IPA 120, BE 130 transforms the in-lining code and related tasks, such as in-lining a callee into a caller, deleting the callee in the module containing the caller after in-lining, etc. In an embodiment, BE 130, to in-line the callee, uses the body of the callee copied into the module containing the caller. Alternatively, BE 130 locates the body of the callee from a provided location such as a shared file, a library, etc. Further, BE 130 may clone the callee and use the clone, instead of the callee, for in-lining purposes.

A Method Embodiment

Figure 2:
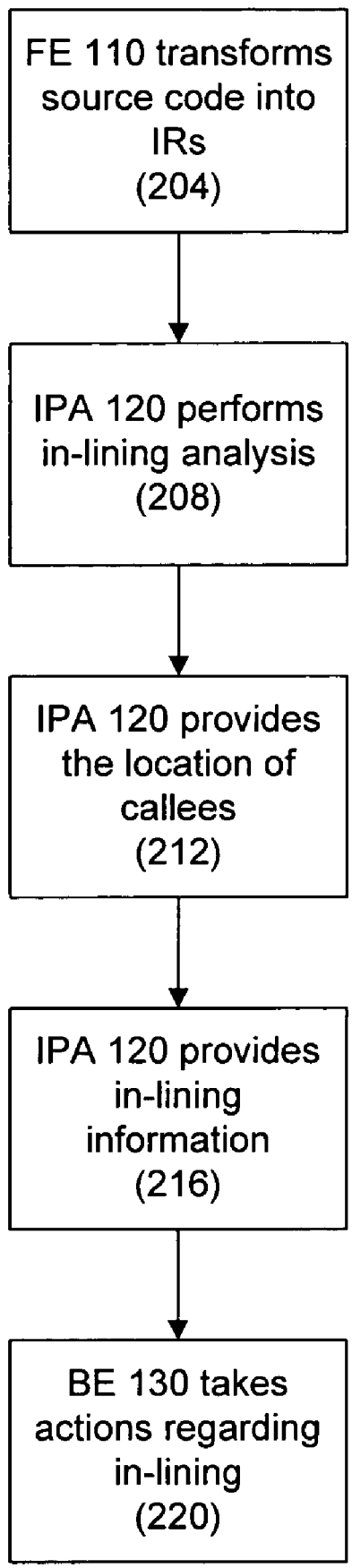
FIG. 2 shows a flowchart illustrating a method embodiment for cross-module in-lining.

FIG. 2 is a flowchart 200 illustrating a method embodiment for cross-module in-lining.

In step 204, FE 110 transforms source code in modules f1.c to fn.c into IRs and store them in modules f1(1).o to fn(1).o. FE 110 also provides the relationship between the callers and callees, e.g., which function calls and/or is called by another function. Such relationship may be provided in the data summary.

In step 208, IPA 120, based on the data summary, performs in-lining analysis on the IR modules f1(1).o to fn(1).o, including determining which functions are to be in-lined. IPA 120 uses various techniques for analyzing described above, including analyzing the advantages/disadvantages of in-lining, creating the call graphs, etc.

In step 212, IPA 120, based on the analysis having information about the caller(s) and callee(s), provides the locations of the callee so that it is later in-lined into the caller. Alternatively, IPA 120 copies the body of the callee(s) into the module(s) containing the caller(s). IPA also generates OIR modules f1(2).o to fn(2).o.

In step 216, IPA 120 generates information including instructions for BE 130 to transform in-lining code and perform related tasks such as deleting a particular callee after it is in-lined. Depending on implementation, the location of the callee may be part of such information.

In step 220, BE 130, based on the instructions from IPA 120, takes appropriate actions regarding in-lining, and also generates OIR modules f1(3).o to fn(3).o.

First Example of Cross-Module In-Lining

FIG. 3A to 3D shows three modules f1.c, f2.c, and f3.c and their corresponding IR and OIR modules for illustrating cross-module in-lining in those three modules in accordance with an embodiment of the invention.

In FIG. 3A, module f1.c includes a function foo( ) at line 305 that, at line 310, invokes a function bar( ); module f2.c includes the body of function bar( ) at line 315 that, at line 320, invokes a function func( ); and module f3.c includes the body of function func( ) at line 325. For illustration purposes, IPA 120, after its in-lining analysis, determines that function bar( ) at line 315 is to be in-lined into function foo( ). That is, at the completion of the in-lining process, the call to function bar( ) at line 310 is replaced by the code of function bar( ) (or its clone), and there is no change to function func( ) at line 325. Modules f1.c, f2.c, and f3.c also include other source code that is not shown.

FIG. 3B shows modules f1(1).o, f2(1).o, and f3(1).o that are created by FE 110 in accordance with an embodiment. Modules f1(1).o, f2(1).o, and f3(1).o are transformed from modules f1.c, f2.c, and f3.c, respectively, and include the summary data (not show) indicating that function foo( ) in module f1.c invokes function bar( ) at line 310 and that function bar( ) in module f2.c invokes function func( ) at line 320. Modules f1(1).o, f2(1).o, and f3(1).o also include IRs that are not shown.

FIG. 3C shows modules f1(2).o, f2(2).o, and f3(2).o that are created by IPA 120 in accordance an embodiment. Modules f1(2).o, f2(2).o, and f3(2).o are transformed from modules f1(1).o, f2(1).o, and f3(1).o, respectively, and include un-shown IRs optimized from IRs in those modules f1(1).o, f2(1).o, and f3(1).o. Module f1(2).o being transformed from module f1(1).o includes function foo( ) at line 305 and function bar( ) at line 330; Function bar( ) at line 330 is included in module f1(2).o so that its code is later in-lined at line 310 of function foo( ). Module f2(2).o being transformed from module f2(1).o remains including function bar( ) at line 315; and module f3(2).o being transformed from module f3(1).o remains including function func( ) at line 325.

FIG. 3D shows modules f1(3).o, f2(3).o, and f3(3).o that are created by BE 130 in accordance with an embodiment. Modules f1(3).o, f2(3).o, and f3(3).o are transformed from OIR modules f1(2).o, f2(2).o, and f3(2).o, respectively, and include OIRs further optimized from OIRs in those modules f1(2).o, f2(2).o, and f3(2).o. Module f1(3).o being transformed from module f1(2).o includes function foo( ) at line 305 having function bar( ) in-lined at line 310. The in-lined code at line 310 is derived from the code of function bar( ) at line 330. Module f1(3).o also shows that function bar( ) at line 330 is deleted after its code is in-lined into function foo( ). One skilled in the art will recognize that after function bar( ) is copied into module f1(2).o at line 330, IPA 120 may delete function bar( ) at line 315. However, in an embodiment, function bar( ) remains at line 315 in module f2(2).o so that deleting is performed by BE 130.

For illustration purposes that no code in other modules invokes function bar( ), function bar( ) at line 315 is deleted.

That is, module f2(3).o being transformed from module f2(2).o no longer includes function bar( ) at line 315. However, if function bar( ) would be used by any other code, then it would remain in module f2(3).o. Module f3(3).o being transformed from module f(3)(2).o remains including function func( ) at line 325 because there is no change to function func( ) in this example.

Figure 4:
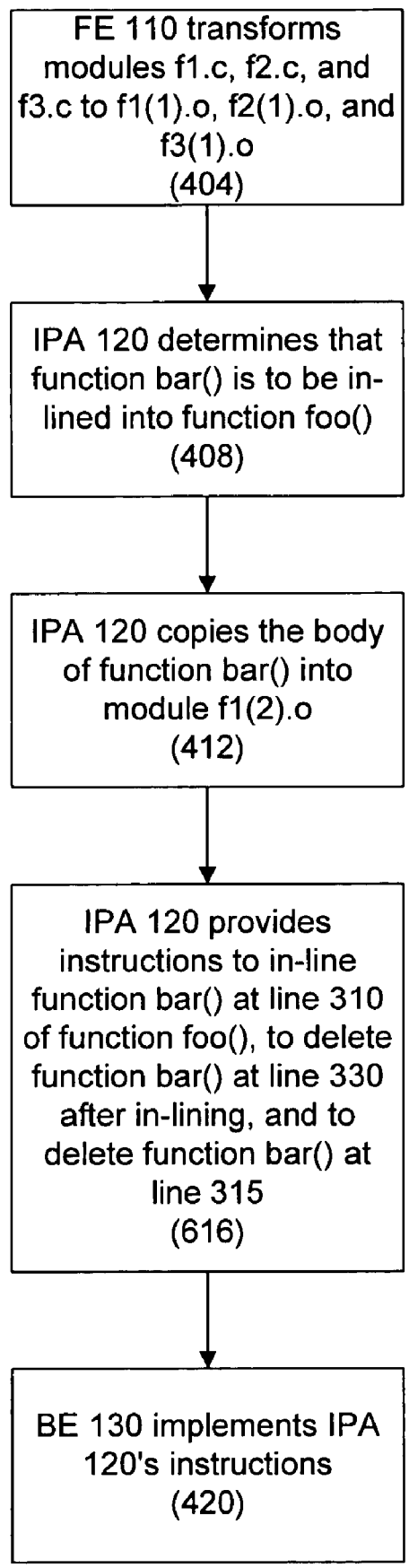
FIG. 4 shows a flowchart illustrating a method embodiment for cross-module in-lining on the three modules in FIGS. 3A-3D.

FIG. 4 shows a flowchart 400 illustrating a method embodiment that transforms modules f1.c, f2.c, and f3.c to modules f1(1).o, f2(1).o, and f3(1).o, modules f1(2).o, f2(2).o, and f3(2).o, and modules f1(3).o, f2(3).o, and f3(3).o in FIGS. 3A-3D. Using the method in flowchart 200 results in the method in flowchart 400.

In step 404, FE 110 transforms modules f1.c, f2.c, and f3.c to modules f1(1).o, f2(1).o, and f3(1).o, respectively. FE 110 also provides the summary data indicating that function foo( ) at line 305 invokes function bar( ), which, in turns, invokes function func( ).

In step 408, IPA 120 performs in-lining analysis on modules f1(1).o, f2(1).o, and f3(1).o. For illustration purposes as in FIGS. 3A to 3D, IPA 120 determines that function bar( ) at line 315 is to be in-lined at line 310 of function foo( ).

In step 412, based on the analysis in step 408, IPA 120 provides the body of function bar( ) to module f1(2).o. In an embodiment, IPA 120 copies the body of function bar( ) at line 315 in module f2(1).o into module f1(2).o at line 330. Alternatively, IPA 120 may clone function bar( ) or provide its location in the instructions in step 416. Function bar( ) is provided in module f1(2).o at line 330 so that is it later in-lined into function foo( ).

In step 416, IPA 120 generates instructions for BE 130 to perform in-lining transformation of function bar( ) and related tasks. In this example, because it is determined that function bar( ) is to be in-lined into function foo( ), the instructions request that BE 130, while transforming module f1(2).o to module f1(3).o, in-lines function bar( ) at line 330 into line 310 of function foo( ) and, after in-lining, delete function bar( ) at line 330. The instructions also request that, while transforming module f2(2).o to module f2(3).o, delete function bar( ) at line 315. However, BE 130, while forming module f3(3).o, remain providing function func( ) at line 325.

In step 420, BE 130 follows the instructions in step 416. For example, BE 130 locates the body of function bar( ) at line 330 and in-lines its code into line 310 of function foo( ) to provide module f1(3).o. BE 130 also deletes function bar( ) at line 315 in module f2(2).o while forming module f2(3).o and keeps function func( ) at line 325 while forming function f3(3).o.

Second Example of Cross-Module In-Lining

FIG. 5A to 5D shows three modules ff1.c, ff2.c, and ff3.c and their corresponding IR and OIR modules for illustrating cross-module in-lining for those three modules in accordance with an embodiment of the invention.

In FIG. 5A, module ff1.c includes a function ffoo( ) at line 505 that, at line 510, invokes a function bbar( ); module ff2.c includes the body of function bbar( ) at line 515 that, at line 520, invokes a function ffunc( ); and module ff3.c includes the body of function ffunc( ) at line 525. For illustration purposes, IPA 120, after its in-lining analysis, determines that function ffunc( ) at line 525 is to be in-lined into line 520 of function bbar( ) and function bbar( ) is to be in-lined into line 510 of function ffoo( ). That is, at the completion of the in-lining process, the call to function ffunc( ) at line 520 is replaced by the body or clone of function ffunc( ), and the call to function bbar( ) at line 510 is replaced by the body or clone of function bbar( ) including the body or clone of function ffunc( ). Modules ff1.c, ff2.c, and ff3.c also include source code that is not shown.

FIG. 5B shows modules ff1(1).o, ff2(1).o, and ff3(1).o that are created by FE 110 in accordance with an embodiment. Modules ff1(1).o, ff2(1).o, and ff3(1).o are transformed from modules ff(1).c, ff(2).c, and ff(3).c, respectively, and include the summary data (not shown) indicating that function ffoo( ) in module ff1.c invokes function bbar( ) and that function bbar( ) in module ff(2).c invokes function ffunc( ). Modules ff1(1).o, ff2(1).o, and ff3(1).o also include IRs that are not shown.

FIG. 5C shows modules ff1(2).o, ff2(2).o, and ff3(2).o that are created by IPA 120 in accordance an embodiment. Modules ff1(2).o, ff2(2).o, and ff3(2).o are transformed from modules ff1(1).o, ff2(1).o, and ff3(1).o, respectively, and include un-shown IRs optimized from IRs in those modules ff1(1).o, ff2(1).o, and ff3(1).o. Further, module ff1(2).o being transformed from module ff1(1).o includes function ffoo( ) at line 505, function bbar( ) at line 530, and function ffunc( ) at line 540; module ff2(2).o being transformed from module ff2(1).o includes function bbar( ) at line 515; and module ff3(2).o being transformed from module ff3(1).o includes function ffunc( ) at line 525. Function bbar( ) is included in module ff1(2).o at line 530 so that its code is later in-lined at line 510 of function ffoo( ). Similarly, function ffunc( ) is included in module ff1(2).o at line 540 so that its code is later in-lined at line 520 of function bbar( ).

FIG. 5D shows modules ff1(3).o, ff2(3).o, and ff3(3).o that are created by BE 130 in accordance with an embodiment. Modules ff1(3).o, ff2(3).o, and ff(3).o are transformed from OIR modules ff1(2).o, ff2(2).o, and ff3(2).o, respectively, and include OIRs further optimized from OIRs in those modules ff1(2).o, ff2(2).o, and ff3(2).o. Module ff1(3).o being transformed from module ff1(2).o includes function ffoo( ) having function bbar( ) in-lined at line 310 of function ffoo( ) and function ffunc( ) in-lined at line 320 of function bbar( ). Module ff2(3).o being transformed from module ff2(2).o no longer includes function bbar( ) at line 515; and module ff3(3).o being transformed from module ff2(3).o no longer includes function ffunc( ) at line 525.

Figure 6:
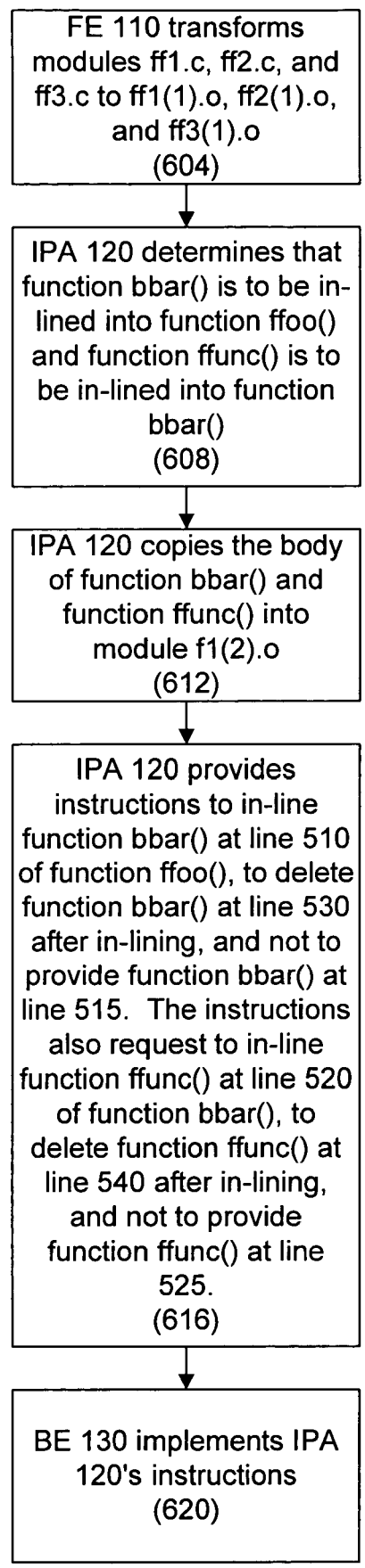
FIG. 6 shows a flowchart illustrating a method embodiment for cross-module in-lining on the three modules in FIGS. 5A-5D.

FIG. 6 shows a flowchart 600 illustrating a method embodiment that transforms modules ff1.c, ff2.c, and ff3.c to modules ff1(1).o, ff2(1).o, and ff3(1).o, modules ff1(2).o, ff2(2).o, and ff3(2).o, and modules ff1(3).o, ff2(3).o, and ff3(3).o in FIGS. 5A-5D. Using the method in flowchart 200 results in the method in flowchart 600.

In step 604, FE 110 transforms modules ff1.c, ff2.c, and ff3.c to modules ff1(1).o, ff2(1).o, and ff3(1).o, respectively. FE 110 also provides the summary data indicating that function ffoo( ) invokes function bbar( ), which, in turns, invokes function ffunc( ).

In step 608, IPA 120 performs in-lining analysis on modules ff1(1).o, ff2(1).o, and ff3(1).o. For illustration purposes as in FIGS. 5A to 5D, IPA 120 determines that function ffunc( ) at line 525 is to be in-lined at line 520 of function bbar( ), and function bbar( ) at line 515 is to be in-lined at line 510 of function ffoo( ).

In step 612, based on the analysis in step 608, IPA 120 provides the body or clone of function bbar( ) and function ffunc( ) to module ff1(2).o. In an embodiment, while forming module ff1(2).o, IPA 120 copies the body of function bbar( ) at line 515 into module ff1(2).o at line 530. Similarly IPA 120 copies the body of function ffunc( ) at line 525 into module ff1(2).o at line 540. Alternatively, IPA 120 may provide the clone and/or the locations of function bbar( ) and/or function ffunc( ), e.g., in the instructions in step 616. Function bbar( ) is provided in module ff1(2).o at line 530 so that its code is later in-lined at line 510 of function ffoo( ). Similarly, function ffunc( ) is provided in module ff1(2).o at line 540 so that its code is later in-lined at line 520 of function bbar( ).

In step 616, IPA 120 generates instructions for BE 130 to perform in-lining transformation for function bbar( ) and function ffunc( ) and related tasks. In this example, because it is determined that function bbar( ) is to be in-lined into function ffoo( ), and function ffunc( ) is to be in-lined into function bbar( ), the instructions request that BE 130 perform in-lining of function bbar( ) at line 510 of function foo( ), and, after in-lining, delete function bbar( ) at line 530. The instructions further request that BE 130 perform in-lining of function ffunc( ) at line 520 of function bbar( ) now in function ffoo( ), and, after in-lining, delete function ffunc( ) at line 540. Alternatively, the instructions may request that BE 130 perform in-lining of function ffunc( ) to function bbar( ) then in-lining function bbar( ) now including function ffunc( ), into function ffoo( ). The instructions also request that BE 130, while transforming module ff2(2).o to module ff2(3).o, do not include function bbar( ) at line 515 in module ff2(3).o, and, similarly, while forming module ff(3).o, do not provide function ffunc( ) at line 525.

In step 620, BE 130 follows the instructions provided by IPA 120 in step 616. For example, BE 130 locates the body of function bbar( ) at line 530 in module ff1(2).o and in-lines this function bbar( ) at line 510 of function ffoo( ) and also in-lines function ffunc( ) at line 540 into function bbar( ) now in function ffoo( ), thus provides module ff1(3).o. Additionally, BE 130 does not provide function bbar( ) at line 515 while forming module ff2(3).o. Similarly, BE 130 does not provide function ffunc( ) at line 525 while forming module ff3(3).o.

Cloning

FIG. 7A shows a function bar( ) and FIGS. 7B and 7C show function bar( )'s two clones, e.g., function bar_clone_1( ) and function bar_clone_2( ), to illustrate how cloning is performed. In FIG. 7A, the argument list of function bar( ) includes a passing parameter p as an integer, and the body of function bar( ) includes the statement "if" and its corresponding programming code from lines 710 to 740. Accordingly, if (p==0), then the code from lines 710 to 720 is executed, and if (p!=0), then the code from lines 730 to 740 is executed. In this example, function bar_clone_1( ) in FIG. 7B is created for use when (p==0), and, consequently, includes only the code from lines 710 to 720. The code from lines 730 to 740 is eliminated in function bar_clone_1( ) because lines 730 to 740 are not executed when (p==0). Similarly, function bar_clone_2( ) in FIG. 7C is created for use when (p!=0), and the code from lines 710 to 720 in function bar( ) is therefore eliminated in function bar_clone_2( ) because lines 710 to 720 are not executed when (p!=0). Functions bar_clone_1( ) and bar_clone_2( ) are more efficient than function bar( ) because they have code size smaller than that of function bar( ). In various embodiments, IPA 120 and/or BE 130 performs program analysis on potential functions to be cloned, analyzes the advantages and disadvantages of cloning, and creates the clones for in-lining purposes, if the advantages outweigh the disadvantages.

In accordance with techniques of embodiments of the invention, in-lining transformation performed in the back-end phase is advantageous over in-lining transformation performed in the IPA phase because tasks in the back-end phase can be performed in parallel while tasks in the IPA phase is generally done in series. Further, because the back-end phase deals with a module at a time, it requires less memory than the IPA phase, which deals with a plurality of files. In-lining in the back-end phase also enables porting some of the functions related to transformation that would have been done from the IPA phase to the BE phase.

Computer System Overview

Figure 8:
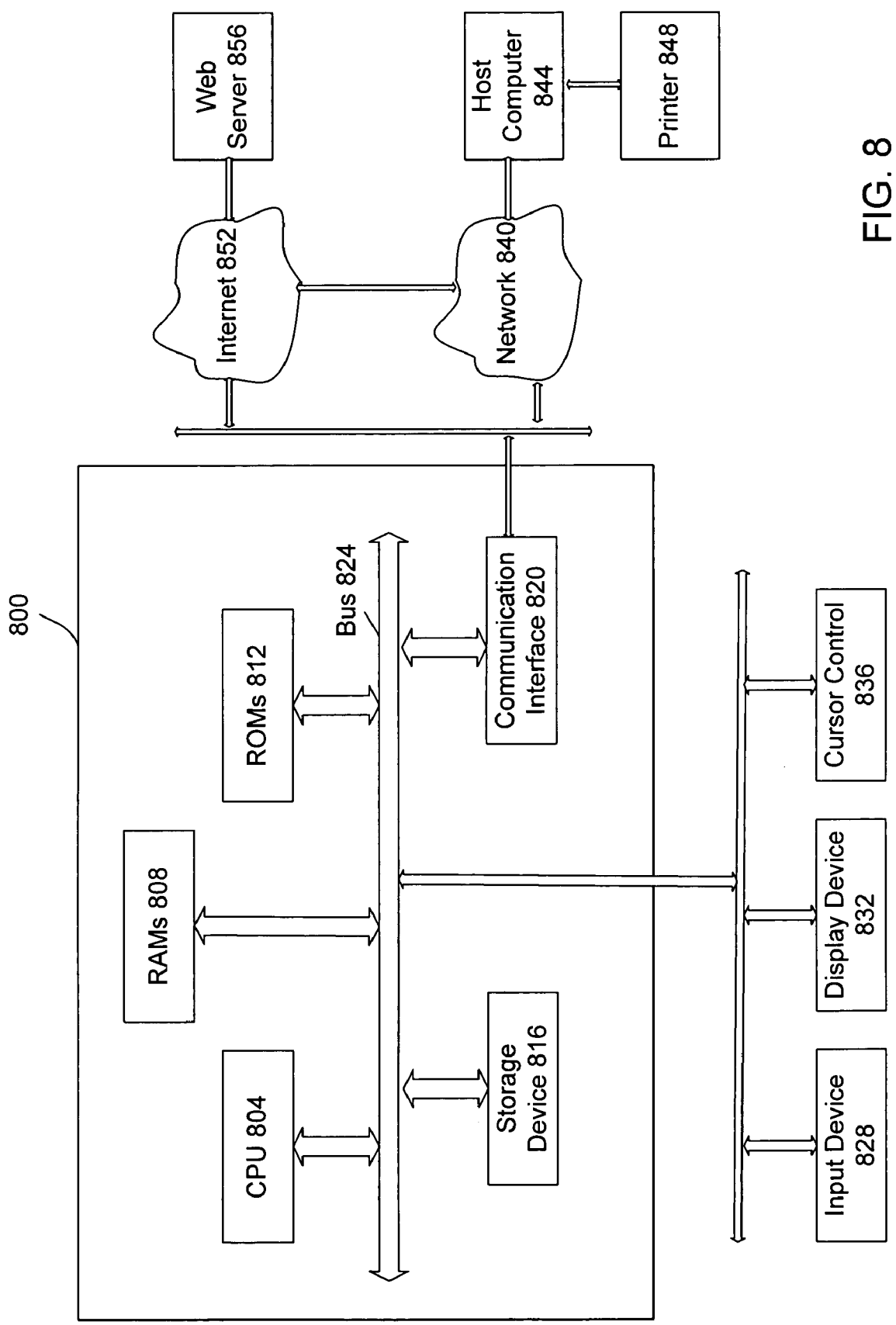
FIG. 8 shows a computer embodiment upon which embodiments of the invention may be implemented.

FIG. 8 is a block diagram showing a computer system 800 upon which an embodiment of the invention may be implemented. For example, computer system 800 may be implemented to run and/or store the compiler 100, to perform tasks in accordance with the techniques described above, etc. In an embodiment, computer system 800 includes a central processing unit (CPU) 804, random access memories (RAMs) 808, read-only memories (ROMs) 812, a storage device 816, and a communication interface 820, all of which are connected to a bus 824.

CPU 804 controls logic, processes information, and coordinates activities within computer system 800. In an embodiment, CPU 804 executes instructions stored in RAMs 808 and ROMs 812, by, for example, coordinating the movement of data from input device 828 to display device 832. CPU 804 may include one or a plurality of processors.

RAMs 808, usually being referred to as main memory, temporarily store information and instructions to be executed by CPU 804. Information in RAMs 808 may be obtained from input device 828 or generated by CPU 804 as part of the algorithmic processes required by the instructions that are executed by CPU 804.

ROMs 812 store information and instructions that, once written in a ROM chip, are read-only and are not modified or removed. In an embodiment, ROMs 812 store commands for configurations and initial operations of computer system 800.

Storage device 816, such as floppy disks, disk drives, or tape drives, durably stores information for use by computer system 800.

Communication interface 820 enables computer system 800 to interface with other computers or devices. Communication interface 820 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 820 may also allow wireless communications.

Bus 824 can be any communication mechanism for communicating information for use by computer system 800. In the example of FIG. 8, bus 824 is a media for transferring data between CPU 804, RAMs 808, ROMs 812, storage device 816, communication interface 820, etc.

Computer system 800 is typically coupled to an input device 828, a display device 832, and a cursor control 836. Input device 828, such as a keyboard including alphanumeric and other keys, communicates information and commands to CPU 804. Display device 832, such as a cathode ray tube (CRT), displays information to users of computer system 800. Cursor control 836, such as a mouse, a trackball, or cursor direction keys, communicates direction information and commands to CPU 804 and controls cursor movement on display device 832.

Computer system 800 may communicate with other computers or devices through one or more networks. For example, computer system 800, using communication interface 820, communicates through a network 840 to another computer 844 connected to a printer 848, or through the world wide web 852 to a server 856. The world wide web 852 is commonly referred to as the "Internet." Alternatively, computer system 800 may access the Internet 852 via network 840.

Computer system 800 may be used to implement the techniques described above. In various embodiments, CPU 804 performs the steps of the techniques by executing instructions brought to RAMs 808. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 804 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 804 are in the form of one or more software programs and are initially stored in a CD-ROM being interfaced with computer system 800 via bus 824. Computer system 800 loads these instructions in RAMs 808, executes some instructions, and sends some instructions via communication interface 820, a modem, and a telephone line to a network, e.g. network 840, the Internet 852, etc. A remote computer, receiving data through a network cable, executes the received instructions and sends the data to computer system 800 to be stored in storage device 816.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for cross-module in-lining, comprising:
   in a first phase of a compiling process, the compiling process comprising a front-end phase, an inter-procedural analysis phase in which cross-module analysis is performed on a plurality of modules, and a back-end phase in which the plurality of modules are processed individually, the inter-procedural phase being the first phase,
   determining to in-line a first function in a first module into a second function in a second module but not performing said in-line during the first phase;
   providing the location of the first function;
   providing instructions for in-lining to be performed in a second phase of the compiling process;
   in the second phase of the compiling process, the back-end phase being the second phase,
   following the instructions to in-line code of the first function into the second function in the second module without accessing the first module.

2. The method of claim 1, in the first phase of the compiling process, further having a third function in the module containing the second function.

3. The method of claim 2, in the second phase of the compiling process, further getting rid of the third function in the module containing the second function after using that third function to in-line its code into the second function.

4. The method of claim 3 wherein the third function being selected from a group consisting of the first function and a clone of the first function.

5. The method of claim 1, wherein, in the second phase of the compiling process, in-lining the code of the first function into the second function uses a clone of the first function.

6. The method of claim 1, wherein, in the second phase of the compiling process, the code used to be in-lined into the second function is stored in a file.

7. The method of claim 1 wherein, in the second phase of the compiling process, the code used to be in-lined into the second function is stored in a library.

8. The method of claim 1 wherein the instructions include at least a list of callees to be in-lined and corresponding callers.

9. A method for compiling a first set of modules having programming source code, comprising:
   in a first phase that represents a front-end phase,
      from the first set of modules, providing a second set of modules having first intermediate representations;
   in a second phase that represents an inter-procedural phase in which cross-module analysis is performed on the second set of modules,
      performing in-line analysis on the second set of modules;
      providing instructions for in-lining to be performed in a third phase of the compiling process rather than performing said in-lining during the second phase; and
      providing a third set of modules having second intermediate representations optimized from the first intermediate representations;
   in the third phase of the compiling process, the third phase representing a back-end phase in which the third set of modules are processed individually,
      following the instructions to perform said in-lining in an individual module without needing to access another module, and
      providing a fourth set of modules having third intermediate representations optimized from the second intermediate representations.

10. The method of claim 9, in the second phase, further using code in the module containing a function caller of a function callee to transform in-lining.

11. The method of claim 10 wherein the code being selected from a body of the function callee.

12. The method of claim 10 wherein the code being selected from a clone of the function callee.

13. The method of claim 9 wherein the instructions include at least one of:
   a set of function caller including at least one function caller;
   a set of function callee including at least one function callee;
   the order for transformation of in-lining;
   the location of at least one function callee; and
   decisions whether to keep a body of at least one function callee after in-lining transformation.

14. A computer-readable medium storing computer-readable instructions and data for compiling a computer program, the computer-readable instructions and data being configured to perform:
   a front-end phase for compiling the computer program;
   a cross-module analysis phase for compiling the computer program; and
   a back-end phase for compiling the computer program;
   wherein
      the front-end phase invokes the cross-module analysis phase;
      the cross-module analysis phase, being configured to process a plurality of modules,
         determines whether a callee is to be in-lined into a caller in the back-end phase without in-lining the callee into the caller during the cross-module analysis phase;
         provides instructions for the back-end phase to transform in-lining code of the callee;
         invokes the back-end phase; and
      the back-end phase, being configured to process the plurality of modules individually,
         transforms the in-lining code in a module based on the instructions without accessing a different module.

15. The computer-readable medium of claim 14 wherein the back-end phase further performs tasks related to in-lining.

16. The computer-readable medium of claim 15 wherein the tasks related to in-lining include at least deleting the callee in a module containing the caller.

17. The computer-readable medium of claim 14 wherein transforming the in-lining code uses code of a clone of the callee.

18. The computer-readable medium of claim 14 wherein a call to the callee is in a module that does not include the callee.

19. The computer-readable medium of claim 14 wherein the instructions include at least a list of callees.

* * * * *

UNITED STATES PATENT AND TRADEMARK OFFICE
CERTIFICATE OF CORRECTION

| | | |
|---|---|---|
| PATENT NO. | : 7,426,725 B2 | Page 1 of 1 |
| APPLICATION NO. | : 10/783761 | |
| DATED | : September 16, 2008 | |
| INVENTOR(S) | : Sungdo Moon et al. | |

It is certified that error appears in the above-identified patent and that said Letters Patent is hereby corrected as shown below:

In column 7, line 31, delete "ff(3).o" and insert -- ff3(3).o --, therefor.

In column 8, line 22, delete "ff(3).o," and insert -- ff3(3).o, --, therefor.

Signed and Sealed this

Twenty-eighth Day of July, 2009

JOHN DOLL
*Acting Director of the United States Patent and Trademark Office*